United States Patent [19]
Murphy et al.

[11] Patent Number: 5,775,780
[45] Date of Patent: Jul. 7, 1998

[54] AUXILIARY VEHICLE SEAT SUPPORT RAIL WITH DYNAMIC SEAT BELT AND SEAT BACK ANCHORING

[75] Inventors: Karl Andrew Murphy, Milford; James Peter Nini, Clinton Township, Macomb County; Kreg S. Bell, Oak Park, all of Mich.

[73] Assignee: General Motors Corporation, Detroit, Mich.

[21] Appl. No.: 901,737

[22] Filed: Jul. 28, 1997

[51] Int. Cl.$^6$ .................................................. B60N 2/42
[52] U.S. Cl. ............................... 297/473; 297/216.18
[58] Field of Search ........................... 297/216.1, 216.18, 297/216.19, 344.1, 473; 248/427, 430

[56] References Cited

U.S. PATENT DOCUMENTS

| | | | |
|---|---|---|---|
| 3,531,154 | 9/1970 | Fleche | 296/65 |
| 3,727,977 | 4/1973 | Gmeiner | 297/344 |
| 4,349,216 | 9/1982 | Pilarski | 280/807 |
| 4,676,556 | 6/1987 | Yamanoi et al. | 297/473 |
| 4,729,602 | 3/1988 | Tokugawa | 297/468 |
| 4,923,214 | 5/1990 | Siegrist et al. | 297/473 X |
| 4,964,608 | 10/1990 | Rogaia et al. | 248/429 |
| 5,125,611 | 6/1992 | Cox | 248/429 |
| 5,226,697 | 7/1993 | Borlinghaus et al. | 297/216 |
| 5,322,348 | 6/1994 | Johnson et al. | 297/473 |
| 5,332,290 | 7/1994 | Borlinghaus et al. | 297/473 |

Primary Examiner—Peter R. Crown
Attorney, Agent, or Firm—Patrick M. Griffin

[57] ABSTRACT

A floor mounted auxiliary support rail of rail for a wide, bench type seat, provides extra load support intermediate the conventional, outboard seat adjuster tracks, as well as providing dynamic anchoring for the seat back and for a traveling seat belt support. A traveling seat belt support is slidably mounted to an auxiliary support rail by a pair of side by side rollers. Beneath the rollers, a pair of locking pins rest below a series of teeth in a rail slot. The rear locking pin is fixed to the seat belt support, while the front locking pin is fixed to an inboard seat back bracket support. The seat back bracket support is pivoted to the head of the forward roller, and the weight of the seat back continually holds the seat back bracket support, as well as the forward roller, down against the upper rail edge, and also holds both pins away from the teeth. A spring pulls the seat belt support back relative to the seat back bracket support, so that the rear roller is held down on the rail edge, as well. In the event of an extraordinary forward force, the seat belt support tips forward about the front roller, pulling the rear roller up against the tension of the spring and driving the rear locking pin into the teeth to anchor the seat belt to the rail and floor. In the event of an extraordinary rearward force, the seat back and its support bracket tip back about the rearward roller, pulling the front roller up against the force of gravity and driving the front locking pin into the teeth to anchor the seat back bracket (and seat back) to the rail and floor.

3 Claims, 5 Drawing Sheets

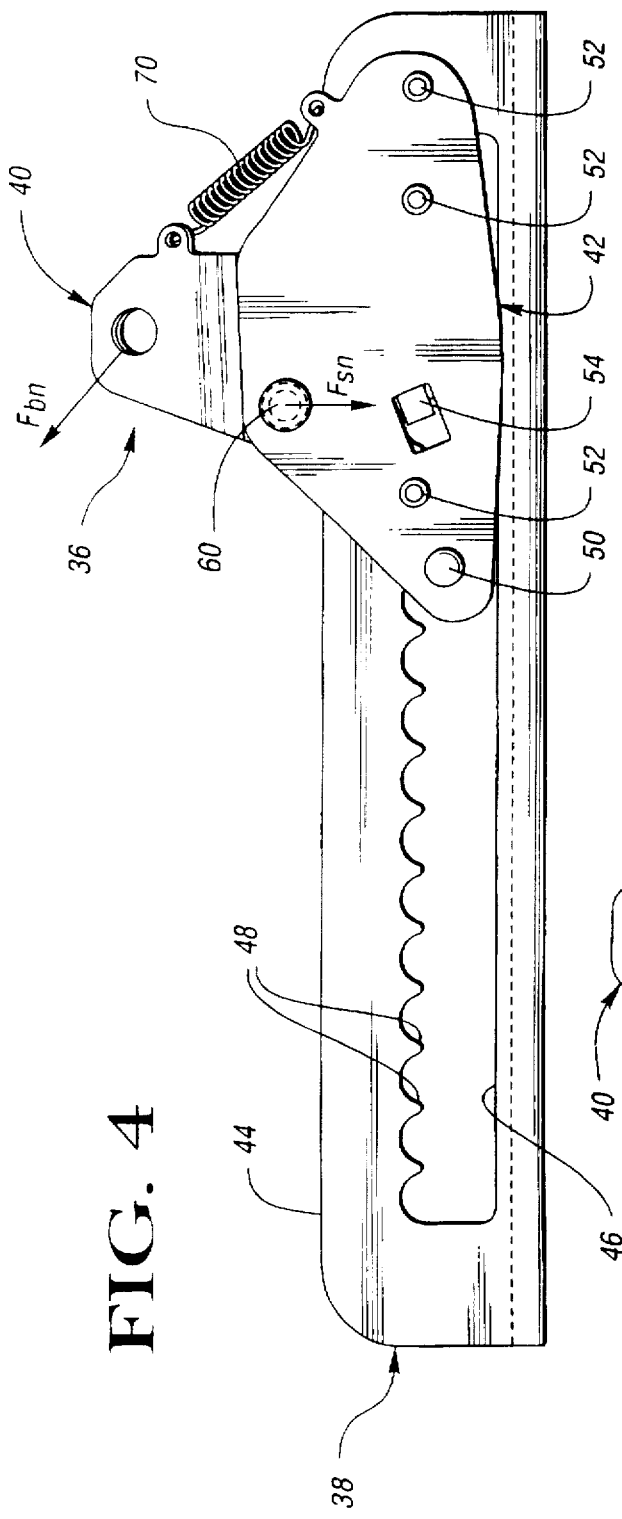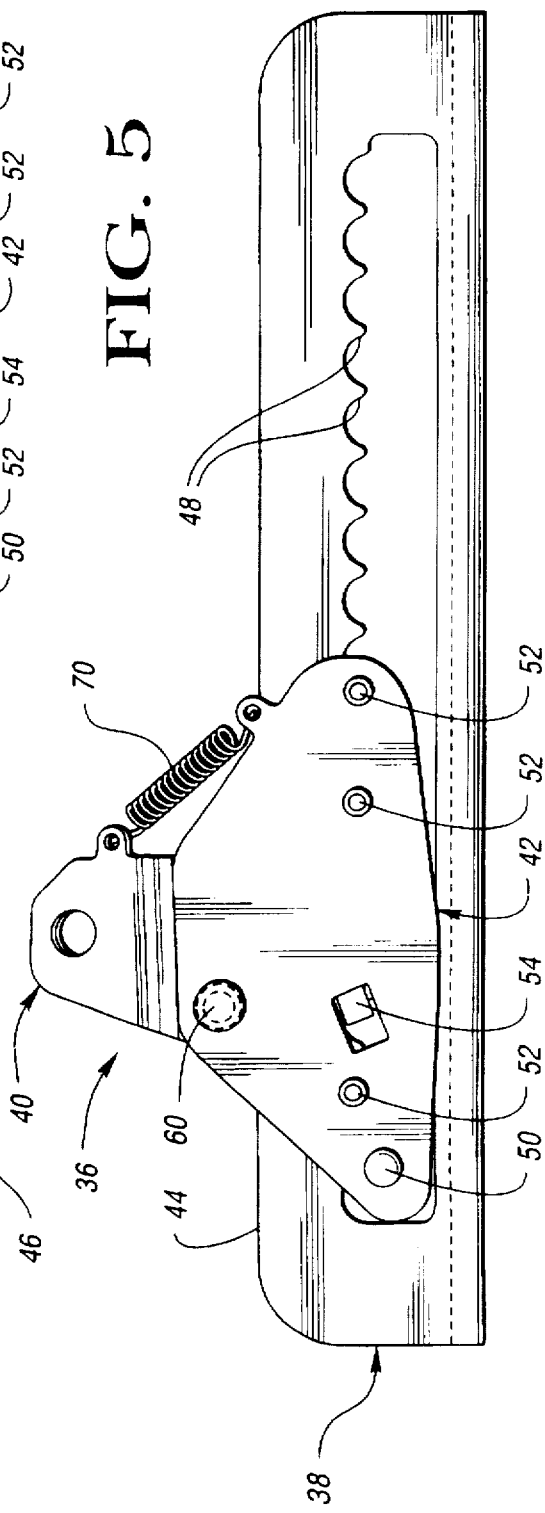

AUXILIARY VEHICLE SEAT SUPPORT RAIL WITH DYNAMIC SEAT BELT AND SEAT BACK ANCHORING

TECHNICAL FIELD

This invention relates to vehicle seats in general, and specifically to a vehicle seat with an auxiliary support rail that also acts to anchor both a movable seat belt support and seat back dynamically to the vehicle in the event of extraordinary deceleration or acceleration forces.

BACKGROUND OF THE INVENTION

Narrower, so called bucket or individual seats can be adequately supported in a vehicle by a single pair of parallel seat tracks, which support the seat cushion frame to the floor and allow it to be slidably adjusted back and forth. The seat back is pivoted to the seat cushion frame, often by a recliner mechanism, which includes lower brackets, one on each side, fixed to the seat cushion frame. The seat back is subject to ordinary, everyday rearward forces in operation, from the rearward leaning of the seat occupants and normal engine acceleration, which the recliner mechanism can easily handle. The seat back is also potentially subject to larger, extraordinary rearward forces, such as the sudden acceleration of the vehicle attendant upon a rear impact. The seat occupant is forced into the seat back, which is forced backward about the recliner mechanism. While the seat back and recliner mechanisms are made robust enough to hold up, the recliner mechanism may deform slightly under such forces, which are generally resisted only by strength of the recliner lower bracket's mechanical attachment to the seat cushion frame. With individual seats having individual occupants, conventional seat tracks and recliner attachments are sufficient to handle any expected forces. In the case of wider, so called bench seats, which support two or more occupants, including center occupants, conventional seat tracks and seat back attachment brackets may have to be strengthened, or extra ones provided. Center occupant weight, if supported only by two, widely spaced tracks, is analogous to a weight sitting at the center of a board supported by only two widely spaced saw horses. Likewise, a center occupant forced against the seat back in the event of extraordinary acceleration of the vehicle stresses the seat back at a point midway between two widely spaced seat back brackets.

Seat belts and their lower attachment points are also subject both to ordinary, forwardly acting tension forces, and potentially subject to greater, extraordinary tension forces, as in the sudden deceleration attendant upon a front impact. A relatively recent trend in vehicle seat design is the provision of a lower seat belt attachment point (for buckle, or webbing, or both) that moves concurrently with the seat and seat cushion, maintaining a consistent relative position, rather than being directly fixed to the vehicle body floor. This may be accomplished by fixing the belt directly to the seat frame, in which case belt loads are indirectly transferred to the vehicle floor through the seat adjuster tracks. However, means also exist for transferring belt loads more directly to the vehicle body floor, while still maintaining the benefit of a moving belt attachment point. Typically, a belt support member is attached to the seat, so as to move with it, but a toothed bar pivotally anchored to the vehicle floor is also provided below the belt support member. The belt support member, in turn, carries a locking pin that slides along below the toothed bar. A deformable plastic sheath is used to prevent the locking pin from engaging the teeth during normal operation. In the event of a stronger than normal pull on the belt, the locking pin is pulled up and into the toothed bar, crushing the sheath, and the loads are transferred directly to the vehicle floor. Typically, these toothed bars are passive except in the event of a collision, and provide no other function but the dynamic seat belt anchoring. An example may be seen in co assigned U.S. Pat. No. 5,226,697 issued Jul. 13, 1993 to Borlinghaus et al., and there are numerous other patents disclosing variations of the same basic design.

SUMMARY OF THE INVENTION

The subject invention provides all of the desired features noted above, in one compact mechanism. In the preferred embodiment disclosed, a wide, bench type seat has a cushion frame that is supported at its two outboard sides by two widely spaced, conventional adjuster tracks. An equally wide seat back is pivoted to the seat cushion frame by a conventional recliner mechanism. The recliner mechanism has two widely spaced, outboard lower brackets that are bolted directly to the sides of the seat cushion frame in such a way as to remain stationary when the seat back is subject to normal rearward forces, but to allow a limited degree of backward pivoting if the seat back is forced backward with greater force. The invention provides extra load support intermediate the widely spaced sides of the seat, as well as dynamic anchoring for the seat back, and also provides a movable seat belt support that has dynamic anchoring.

A pair of parallel auxiliary support rails, located inboard of the sides of the seat, are fixed to the floor generally below the center occupant position. Each rail is a single, solid piece, with an upper straight edge and a narrow rectangular slot below cut with a series of locking teeth just below the upper edge. Riding on and over each rail upper edge is a seat belt support comprised of a pair of inner and outer plates sandwiched together around the rail by a pair of side by side pivot pins. Each pin journals a cylindrical roller thereon, so that the seat belt support can roll back and forth freely on the rollers. A seat belt buckle or belt webbing is attached to the top of each seat belt support, above the rollers, so that a pull on the belt puts a forward moment on the seat belt support, tending to tip it forward about the forward most pivot pin and roller. Below the rollers, a locking pin is fixed to the seat belt support below the rollers, which normally moves freely in the rail slot, but which can engage the locking teeth if and when the belt support tips forwardly.

A seat back bracket support is attached to the inboard head of each of the forward most pivot pins. The seat back also has two extra inboard brackets aligned with the two auxiliary rails, each of which is attached rigidly to a respective seat back bracket support. Therefore, the weight of the seat back, and, indirectly, part of the weight of the seat occupants, is transferred through the seat back bracket supports to the rollers. This weight is transferred most directly to the forward most rollers, to which the seat back brackets are directly attached, so the forward most rollers are continually held down against the rail upper edges, at least in the absence of extraordinary backward forces on the seat back. However, the seat belt supports can still independently tip forward relative to the seat back bracket supports about the forward pivot pin-rollers, if pulled forward by the belt. Therefore, an extension spring is stretched between each seat belt support and the rear of its respective seat back bracket support, strong enough to counterbalance ordinary belt forces, and thereby keep the rear rollers on the rail edges. Finally, another locking pin is fixed to each seat back bracket support, forward of the locking pin on the seat belt support. The forward locking pin is also capable of engaging the locking teeth if the seat back bracket support is tipped rearward in response to an extraordinary rearward force on the seat back.

In normal operation, as the seat is adjusted fore and aft on the conventional, outboard tracks, each auxiliary support mechanism concurrently rolls back and forth on the rails. The lower belt attachment points maintain a constant position relative to the seat cushion frame, and the seat receives extra weight support near the center. In the event of an extraordinary forward acceleration of the vehicle, the seat belt supports tip forward about the front rollers, independently of the seat back bracket supports, stretching the springs. The rear locking pins are driven into the locking teeth, and belt loads are anchored directly to the vehicle floor. In the event of an extraordinary rearward deceleration of the vehicle, the seat back and all of the seat back brackets and the bracket supports to which they are fixed are tipped backward. Concurrently, the front rollers are lifted from the rail edges and the front locking pins are driven into the locking teeth, anchoring the seat back directly to the vehicle floor. So, several functions, including self compensating belt motion, extra seat support, and front and rear dynamic anchoring, are provided by the same structure.

BRIEF DESCRIPTION OF THE DRAWINGS

These and other features will appear from the following written description, and from drawings, in which:

FIG. 4 is a side view of the invention in a rearward adjusted position;

FIG. 5 is a side view of the invention in a forward adjusted position;

DESCRIPTION OF THE PREFERRED EMBODIMENT

Figure 1:
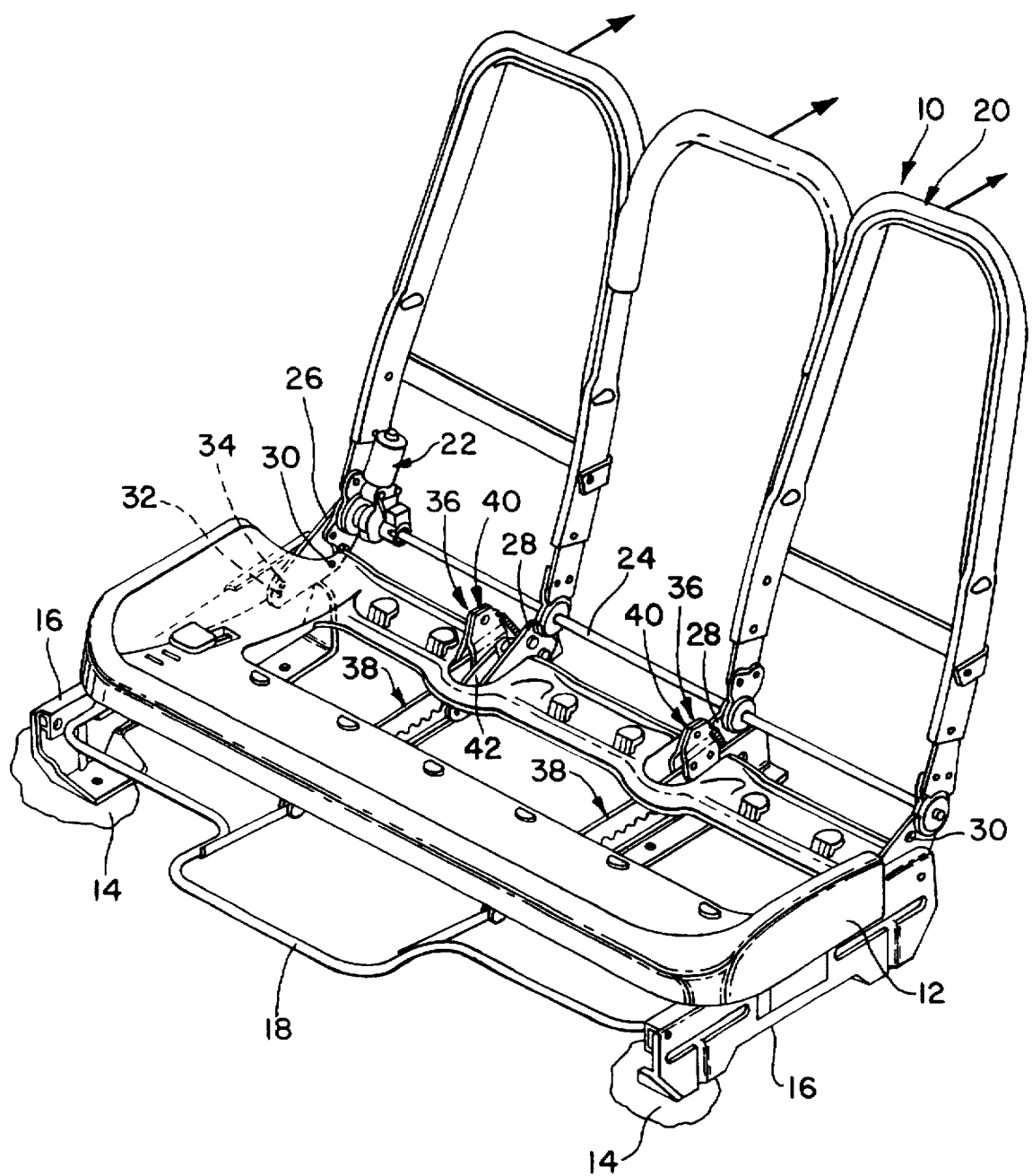
FIG. 1 is a perspective view of a bench type seat incorporating a preferred embodiment of the invention.

Referring first to FIG. 1, the invention is incorporated with a so called bench type seat 10, which includes a wide seat cushion frame 12 supported on a vehicle body floor 14 by a widely spaced parallel pair of primary, outboard seat adjuster tracks 16. The tracks 16 are released by a conventional bar 18 to move the seat cushion frame 12 fore and aft. Moving along with the seat cushion frame 12 is an equally wide seat back, indicated generally at 20. Seat back 20 is comprised of three contiguous U shaped sub frames with two outboard legs and two inboard legs, and is thus wide enough to accommodate three occupants, including a central occupant. The seat back 20 is attached to the cushion frame 12, indirectly, by a conventional power recliner mechanism, indicated generally at 22. Recliner 22 has a long pivot rod 24 that runs cross car through the four lower leg ends of the seat back 18. The recliner 22, in turn, is attached to the seat cushion frame 12 at the same four points through four seat back brackets, two outboard brackets 26 and two inboard brackets 28. The seat back 20 is tilted relative to the seat cushion frame 12 to a desired reclined position by adjustment of the recliner 22. The operation of the subject invention would be the same, however, even if the seat back 20 were attached directly to the seat cushion frame 12 through the brackets 26 and 28, without the controlled tilting provided by interposed recliner 22. The seat back 20 is subject to ordinary backward forces, as indicated by the arrows, due to rearward leaning of the seat occupants or normal vehicle forward acceleration. It is also potentially subject to extraordinary, higher than normal rearward forces, as in the event of a rear impact. Such forces could bend or deform the seat back 20, if high enough. Alternately, if a suitable pivot axis were available, the seat back 20 could rotate or tip slightly backward relative to the seat cushion 12. Or, further deformation could occur after the rotation stopped. Here, such a pivot axis is provided about which the seat back 20 can tip or rotate in a controlled, limited fashion, in preference to the other potential axis of the recliner pivot rod 24. Specifically, the outboard seat back brackets 26 are each attached to the sides of the seat cushion 12 with two bolts, a rear bolt 30 that runs through a close fitting slot, and a front bolt 32 that runs through an arcuate slot 34 arrayed about the center of rear bolt 30. Each front bolt 32 is tightened down over the edges of arcuate slot 34 tightly enough to resist any rotation of the outboard seat back bracket 26 in response to normal forces on seat back 20, but can slip, in response to higher forces, to allow rotation about the axis of the aligned rear bolts 30, at least to the extent allowed by the length of the slots 34. The subject invention allows the other, inboard seat back brackets 28 to follow the rotation of the outboard seat tracks 26, in a manner described in detail below. The seat 10 also incorporates several seat belts, not illustrated, which have at least two lower attachment points, indicated by the forwardly pointing arrows in FIG. 1. These belt attachment points may each comprise one or more buckles or webbing as needed to provide the belt configuration and number desired. In any event, the belts would be subject to ordinary, tension forces, acting in the direction shown, due simply to occupant forward leading or ordinary deceleration forces, such as braking. As with the seat back 20, the belts would also be potentially subject to extraordinary tension forces due to higher than normal deceleration, as in the case of a front impact. The invention also dynamically anchors the belt attachments, in the event of higher than normal deceleration.

Figure 2:
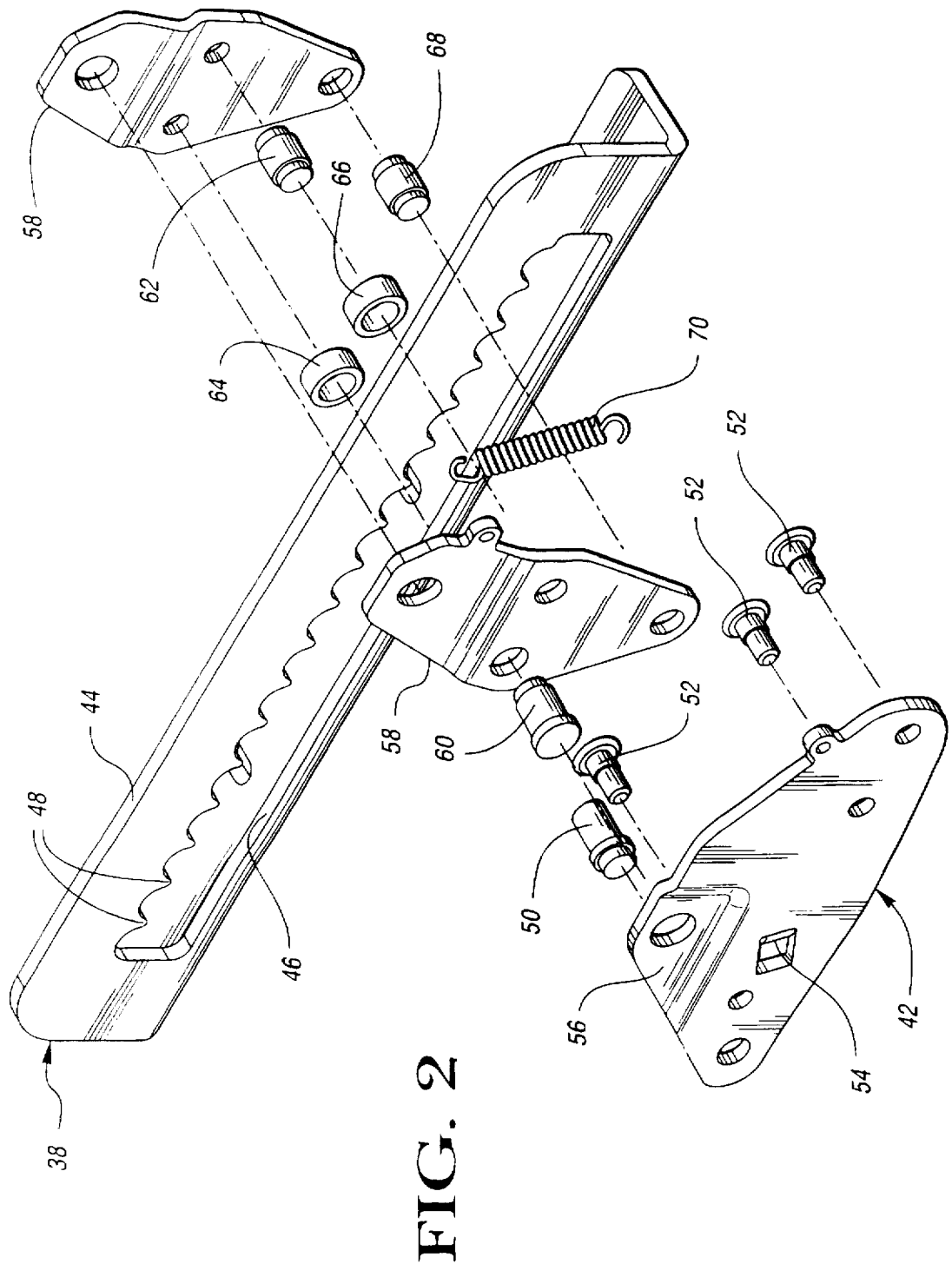
FIG. 2 is a perspective disassembled view of the invention.
Figure 3:
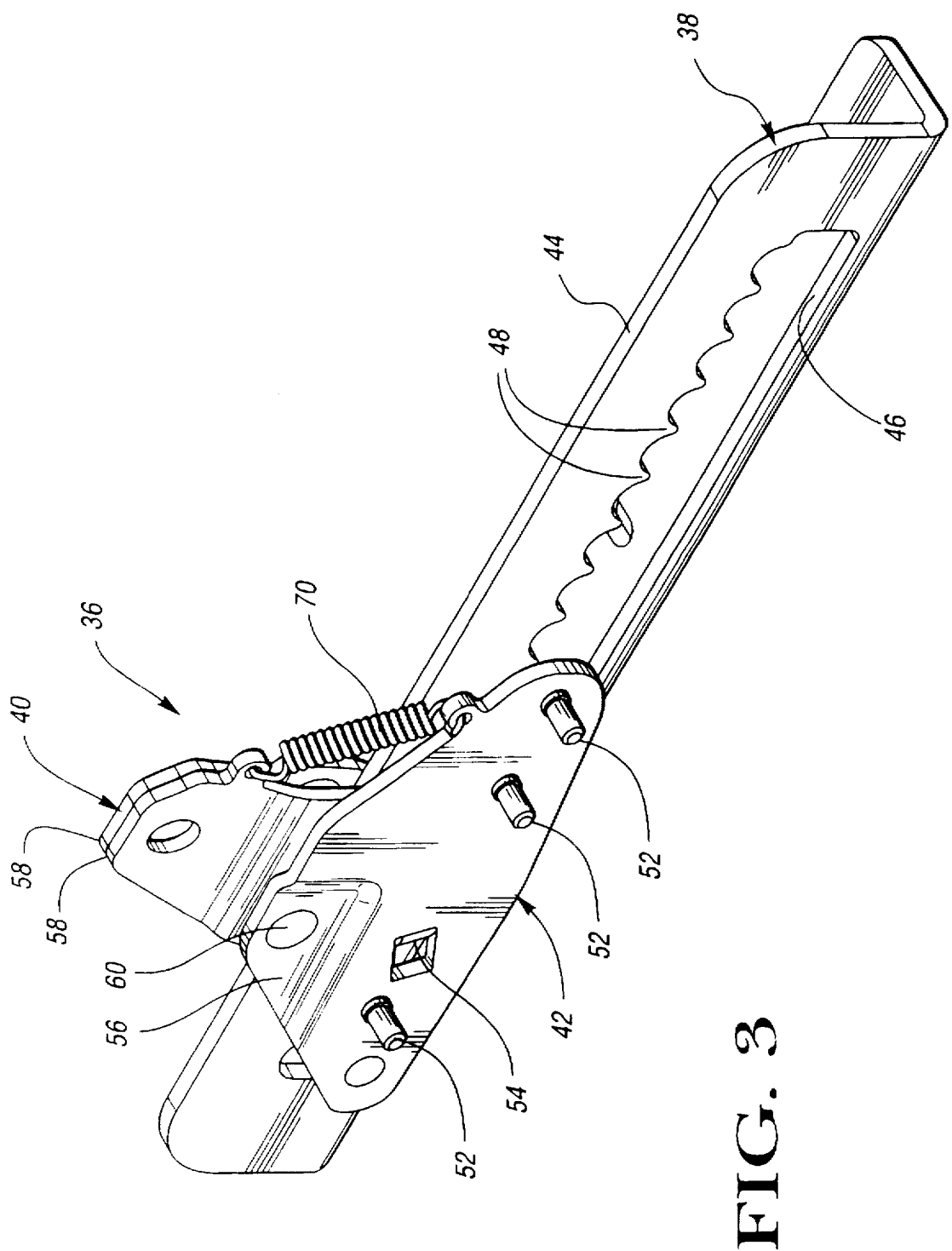
FIG. 3 is a perspective assembled view of the invention.

Referring next to FIGS. 1, 2 and 3, a preferred embodiment of the combined auxiliary support rail and dynamic seat belt and seat back anchoring mechanism of the subject invention, of which two are incorporated in seat 10, is indicated generally at 36. Although basically identical, the two mechanisms 36 are oriented in mirror image about the centerline of the vehicle floor 14, so that there is a specific right and left mechanism 36, as seen in FIG. 1. A detailed description is provided for the right mechanism 36 (right from the perspective of a seat occupant) in the Figures following FIG. 1, which applies equally well to each. Each mechanism 36 consists of three basic parts, a support rail, indicated generally at 36 , a seat belt support, indicated generally at 40, and an inboard seat back bracket support, indicated generally at 42, one for each inboard seat back bracket 28. The stationary base or foundations of the mechanisms 36 are the stamped steel support rails 38. Two rails 38 are bolted to the vehicle floor 14 below the seat cushion 12, parallel to one another and to the primary seat tracks 16, and located just outboard of the inboard seat back brackets 28. Each rail 38 has a straight, substantially horizontal upper edge 44, comparable in length to the primary adjuster tracks 16, below which a narrow rectangular slot 46 runs for most of its length. The upper edge of each slot 46 is formed with a regular series of locking teeth 48. The seat back bracket support 42 is a generally triangular stamped steel plate, which has a robust locking pin 50 rigidly attached to it's lower forward corner, extending outboard. Three smaller seat back bracket studs 52 are rigidly attached along it's lower edge, extending inboard, to which an inboard seat back bracket 28 is ultimately fixed. A stop tab 54 is lanced near the lower edge, for a purpose described below. At the upper corner of the triangle, an offset stamped boss 56 is formed. The seat belt support 40 consists basically of two generally diamond shaped stamped steel plates 58, which are sandwiched around the rail 38 to slide back and forth thereon. Specifically, a longer, front pivot pin 60 and a shorter, rear pivot pin 62, each of which is surrounded by a free turning roller 64 and 66 respectively, along with a rear locking pin 68, serve to hold both the pair of plates 58 and the seat back bracket support 42 together. First, the rear locking pin 68 is captured between the lower corners of the two plates 58, running through the rail slot 46, and spun down on both ends. This loosely holds the two plates 58 together on rail 38. Next, the rear pivot pin 62 (with roller 66 )is captured between the two plates 58, just above the rail edge 44, and spun down at both ends. Then, the longer, front pivot pin 60, which has a wider head at its outer end, is inserted narrow end first through the seat back bracket support boss 56, through the aligned plates 58 and through the front roller 64 (which is held between the plates 58). The narrow end of the front pin 60 is then spun down, at which point both the plates 58 are captured slidably on the rail 38, with the rollers 64 and 66 located above the upper rail edge 44, and with the two locking pins 50 and 68 located in the rail slot 46. Finally, a stretched coil extension spring 70 is hooked between the attached plates 58, from a point near their upper ends, to the rear of the seat back bracket support 42, completing the mechanism 36, as seen in FIG. 3. Stretched spring 70 tends to pull the seat back bracket support 42 and rotate it up about the wider head of the front pivot pin 60, but the degree of relative rotation is limited, at least prior to installation of the mechanism 36, by stop tab 54 hitting the edge of the plates 58. The actual function of spring 70 is not related to the assembly of mechanism 36, but to its post installation operation, described next.

Referring next to FIGS. 1, 4 and 5, the normal operation of seat 10 and mechanism 36 is illustrated. Each mechanism 36 is installed by fixing a respective inboard seat back bracket 28 to the three short studs 58 on a support 42, which are spun down over the outer surface of the bracket 28. Then, when seat 10 and the primary seat adjuster tracks 16 are installed to the vehicle, the rails 38 are also bolted stationary to the vehicle floor 14. Belt webbing and/or buckles are fixed to the top corners of the seat belt supports 40. When the seat cushion frame 12 is supporting occupants, especially in the center, it is stressed downwardly, and more so toward the center. There is no direct connection between the seat cushion frame 12 and the mechanisms 36 as illustrated, since the cushion frame 12 is slotted to clear the mechanisms 36. However, the cushion frame 12 could be designed to bow down enough, under normal loading, to contact the seat back bracket supports 42, and thereby force the rollers 64 and 66 against the rail upper edges 44. That load would be seen most strongly by the front pivot pins 60 and rollers 64, since they are directly connected to the bracket supports 42. Likewise, the weight of the seat back 20 itself, plus the portion of the occupant weight acting downwardly through seat back 20, will act most directly on and through the front rollers 64. These normal downward weight loads, indicated by the arrow Fsn in FIG. 4, act to keep the front rollers 64 against the rail upper edges 44, in the absence of any extraordinary forces tending to lift them up and away. Likewise, the upper corners of the seat belt supports 40 are subject to normal belt forces, indicated by the arrows labeled Fbn. Because the bracket support 42 is attached to the seat belt support 40 at a single pivot point, that being the head of the front pivot pin 60, the normal belt forces shown at Fbn would be capable of applying a forward moment to the belt support 40 and rotating it relative to the stationary bracket support 42 about the front pin 60, or counterclockwise as seen in FIG. 4. This could lift the rear roller and pivot pin 66–62, at least in the absence of a countervailing rearward moment tending to rotate the seat belt support 40 in the opposite direction, clockwise in FIG. 4. This is provided by the stretched springs 70, which provide enough rear force to counteract the forward pulling, normal seat belt forces, and thereby keep the rear rollers 66 down on the rail upper edges 44. Since the rollers 64 and 66 stay on the rail upper edges 44, the locking pins 50 and 68 are kept out of the locking teeth 48 with no need for a crushable plastic sheath. Therefore, during normal seat operation, when the primary adjuster tracks 16 are released to let seat 10 move back and forth, both mechanisms move passively back (FIG. 4) or forward (FIG. 5) in lock step with seat 10. Both rollers 64 and 66 are kept solidly on the rail upper edges 44, and extra weight support is provided to the center of seat cushion frame 12. Extra weight support alone is an advantage, since the auxiliary rails 38 are much more compact and less costly than conventional seat adjuster tracks 16. The mechanisms 36 also provide dynamic anchoring, in response to extraordinary forces, as described next.

Figure 6:
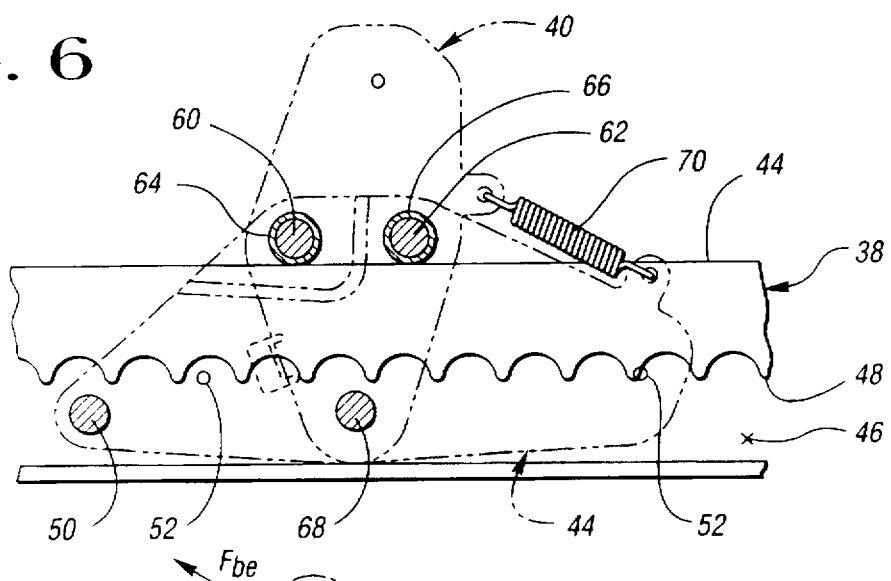
FIG. 6 is a schematic view of the invention in any adjusted position, when subjected to normal forward and rearward forces.
Figure 7:
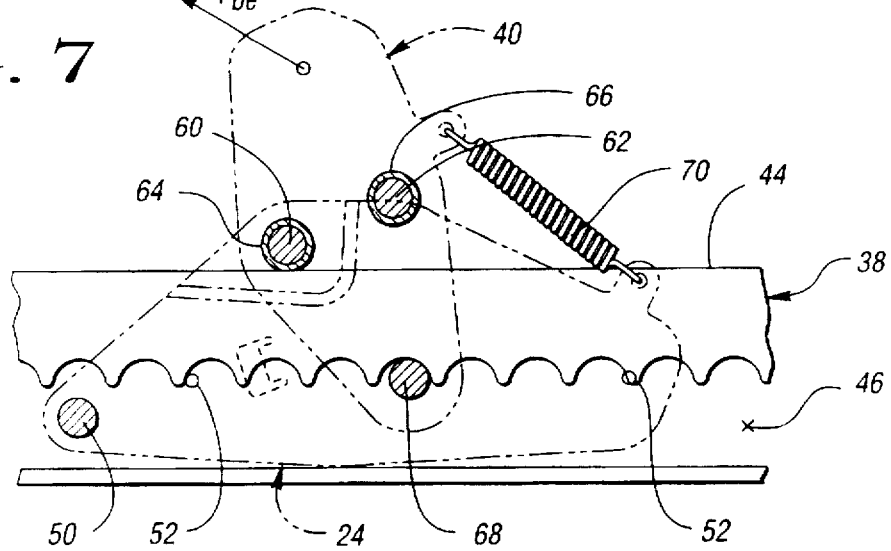
FIG. 7 is a view like FIG. 6, but showing the response to extraordinary forward acting forces.

Referring next to FIGS. 6 and 7, the response of the mechanisms 36 extraordinary deceleration is illustrated. FIG. 6 shows the normal position, with both rollers 64 and 66 firmly on the rail upper edges 44. Both of the locking pins 50 and 68 are thereby held out of and away from the locking teeth 48, with no need for an insulating plastic sheath to prevent engagement. FIG. 7 show the response of mechanism 36 to a greater than normal tension force acting at the top of the seat belt support 40, shown at the arrow labeled Fbe. Such a force, resulting from a frontal collision or the equivalent, would put a forward moment on the seat belt supports 40 strong enough to overcome the force of the springs 70. Most of the downward force on the front rollers 64 would still be present, more than enough to keep the front rollers 64 solidly down against the rail upper edges 44 and to keep the seat back bracket supports 42 from rotating relative to the rail 38. The rear rollers 66 and rear pivot pins 62 can lift up from the rail edge 44, however, due to the forward moment described, rotating counterclockwise about the pivot axis provided by the front rollers and pivot pins 64 and 60. Concurrently, the rear locking pins 68 are rotated up and into the locking teeth 48, providing a direct belt load transfer into the rails 38 to anchor the belts directly to the vehicle floor 14. As soon as normal belt forces return, the springs 70 return the rear rollers 66 to the rail upper edges 44, and the rear locking pins 68 move back down and out of the locking teeth 46.

Figure 8:
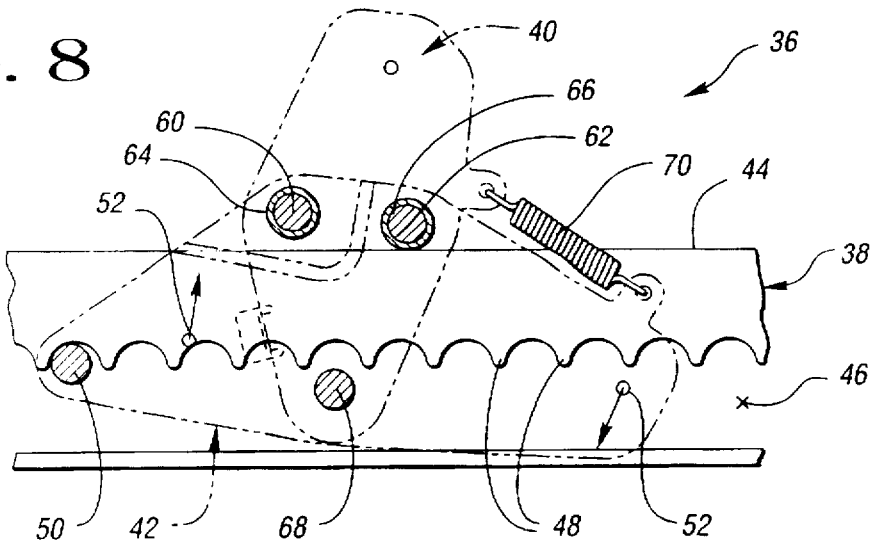
FIG. 8 is a view like FIG. 6, but showing the response to extraordinary rearward acting forces.

Referring next to FIGS. 1 and 8, the response of mechanisms 36 to extraordinary acceleration is illustrated. Again, in the event of a rear collision or the like, higher than normal forces are put on seat back 20, in the direction of the arrows in FIG. 1. This causes a rear moment on seat back 20, transferred ultimately to the outboard seat back brackets 26.

As noted above, the higher than normal rear moment is enough to overcome the tightening force on the heads of the front attachment bolts 32. Rearward pivoting of the seat back 20 and outboard seat back brackets 26 occurs about the pivot axis provided by the rear attachment bolts 30 as the front bolts 32 slip through the arcuate slots 34. Concurrently, the same forces acting on the set back 20 would be transferred to the two inboard seat back brackets 28. A moment would thereby be applied to the seat back brackets supports 42 at the endmost attachment studs 52, as shown by the oppositely directed arrows in FIG. 8. This moment would be sufficient to overcome the normal downward forces on the front rollers 64 and pivot pins 60, as the inboard brackets 28 and their respective supports 42 rotated clockwise, matching the limited backward rotation of the seat back 20 and outboard brackets 26. The front rollers 64 and pivot pins 60 are thereby lifted from the rail upper edges 44. The rear rollers 66 are shown remaining against the rail edges 44, as there are no particular forces acting to lift them, but they do not themselves provide the axis of rearward rotation for the seat bracket supports 42, as do the front pivot pins 60 for the seat belt supports 40. That axis is provided by the outboard bracket rear attachment bolts 30. Simultaneously, the front locking pins 50 are lifted up to engage the locking teeth 48. The rotation of the inboard brackets 28 is thereby stopped, and the forces are transferred directly to the rail 38 and the floor 14. Simultaneously, the rotation of the outboard brackets 26 is stopped by the front attachment bolts 32 bottoming out in the arcuate slots 34, and forces there are transferred to the floor 14 through the primary seat adjuster tracks 16. So, four fairly evenly spaced dynamic anchoring points are provided to resist backward rotation of the seat back 20, rather than just two widely spaced points at the primary seat tracks 16.

In conclusion, a number of functions are provided by the mechanisms 36. Extra weight bearing support is provided for the entire wide seat 10 near the center, without the use of one or more additional seat adjuster tracks 16, which would be much wider and heavier than the relatively thin rail 18. A self compensating lower belt attachment point, as well as dynamic seat belt anchoring, is provided by the belt supports 40 in cooperation with the weight bearing seat back bracket supports 42. Conventional seat belt anchoring bars, running parallel to the rail, are not needed. Dynamic anchoring for the wide seat back 20 is provided for the inboard seat back brackets 28 and their respective supports 42, in cooperation with the slotted outboard seat back brackets 26, a function that would not be provided even with the addition of extra conventional seat adjuster tracks and anchoring bars.

Variations could be made in the preferred embodiment disclosed. The support rail could be formed as a more or less solid piece, such as a forging, without the long through slot 46. Such an alternate rail design could have wide upper edges with a series of downwardly opening locking teeth arrayed beneath the upper edges, formed into an overhanging solid shelf running beside the upper edge. Such a construction would be significantly thicker and heavier than the slotted, single thickness rail 38 disclosed. A single piece seat belt support could ride along the wider upper edges of such a solid, non slotted rail, rather than the two plate, bifurcated seat belt support 40 disclosed. Such a one piece seat belt support would have to be kept "on track" by other means, as, for example, by the use of a pair of wider, side flanged rollers fitted down over the wider upper edges, similar to train wheels on train tracks. An inboard seat back bracket would be pivoted to one end of the front roller, on that side of the seat belt support that had access beneath the locking teeth. Both locking pins in such a design would be fixed only at one of their ends to the seat belt support and seat back bracket support respectively, cantilevered beneath the overhanging toothed shelf. This alternate, heavier design would provide all of the support and anchoring benefits of the disclosed embodiment, and could likely be used where very heavy load and force support was desired. The embodiment disclosed, with the thinner, slotted rail 38, and bifurcated, double plates 58, has assembly advantages, however. The two plates 58 and the rear locking pin 58 sandwiched between them and resting in slot 46, cooperate, along with the pivot pins 60 and 62 also sandwiched between the plates 58, to capture the plates 58 to the rail 38. This helps later installation, since the rail 38, seat belt support 40, and inboard seat bracket support 42 are all captured together, rather than loose parts. Other resilient means could be provided to create a continual rearward moment on the seat belt support 40, to keep the rear roller 66 seated on the rail edge 44. A torsion spring wrapped around the head or front pin 60 could continually act to rotate seat belt support 40 backward relative to the seat back bracket support 42. Or, a compression spring could push the rear roller 66 down relative to the seat back bracket support 42. The tension spring 70 simply hooked between the two supports 40a and 42 is simple and easy to install, however. Therefore, it will be understood that it is not intended to limit the invention to just the embodiment disclosed.

We claim:

1. In a vehicle having a seat with a weight supporting seat cushion frame and a seat back having a pair of outboard brackets supported on said seat cushion frame in such a way as to remain stationary when subjected to ordinary rearward forces to allow limited rearward rotation of said seat back relative to said seat cushion frame about a pivot axis in the event of extraordinary rearward forces caused by extraordinary vehicle acceleration, said seat back also having at least one inboard bracket intermediate said outboard brackets and rotatable therewith about said same pivot axis, with said seat cushion supported on a vehicle floor by a pair of primary, parallel seat adjuster tracks, and also having a seat belt with a lower attachment point, said seat belt attachment point being subject to normal, forwardly directed tension forces in ordinary operation and potentially subject to higher than normal tension forces in the event of extraordinary vehicle deceleration, an auxiliary seat support with combined seat belt and seat back dynamic anchoring, comprising;

at least one auxiliary support rail fixed to said vehicle floor beneath said seat cushion frame and intermediate said primary tracks, said auxiliary rail having a substantially horizontal upper rail edge and a series of locking teeth below said upper rail edge, a seat belt support slidably supported on said auxiliary support rail and having a pair of forward and rearward, side by side pivot pins, said pivot pins each having a roller freely journaled thereon so that said seat belt support can freely roll back and forth on said upper rail edge, said seat belt support further providing said lower seat belt attachment point above said rollers so that belt tension forces can pull forwardly on said seat belt support to create a forward moment acting about said forward roller and pivot pin, an inboard seat back bracket support pivotally supported to said seat belt support at said forward pivot pin, so that said seat belt support can pivot forward independently of and relative to said inboard seat back bracket support about said forward pivot pin, said inboard seat back bracket support further being fixed to said inboard seat back bracket so that a portion of the weight of said seat acts downwardly through said inboard bracket and bracket support on said forward pivot pin to maintain said forward roller on said rail upper edge in opposition to ordinary rearward forces acting on said seat back and so that extraordinary rearward forces on said seat back create a rearward moment on said inboard seat back bracket support sufficient to lift said forward roller from said rail edge, a resilient means connected between said seat belt support and inboard seat back bracket support sufficiently strong to create a rearward moment on said seat belt support acting about said forward pivot pin and roller and to maintain said rearward roller on said upper rail edge in opposition to normal tension forces acting on said seat belt support, but insufficiently strong to oppose extraordinary belt tension forces pulling on said seat belt attachment point, which are sufficient to create a forward moment about said forward roller and pivot pin sufficient to lift said rearward roller from said upper rail edge, a rearward locking pin fixed to said seat belt support and spaced below said locking teeth when said rollers are both engaged with said upper rail edge, and a forward locking pin fixed to said inboard seat back bracket support and spaced below said locking teeth when said rollers are both engaged with said upper rail edge, whereby, when said seat belt and seat back are both subject to ordinary forces, said seat belt support and inboard seat back bracket support can move together along said upper rail edge, on said rollers, as said seat moves fore and aft on said primary seat tracks and said locking pins remain below said locking teeth and said seat belt attachment point maintains a constant position relative to said seat cushion frame, with the weight of said seat at least partially supported by said rollers rolling on said rail upper edge, and when said seat belt is subject to extraordinary tension forces, said seat belt support rotates forward on said forward pivot pin and roller independently of said inboard seat back bracket support, lifting said rearward roller and pivot pin from said upper rail edge is opposition to said resilient means while concurrently lifting said rearward locking pin into said rail locking teeth to anchor said seat belt support and seat belt against said extraordinary tension forces, and when said seat back is subject to extraordinary rearward forces, said inboard seat back bracket support and said seat belt support rotate together with said seat back and said outboard seat back brackets while lifting said forward roller and pivot pin from said rail upper edge and concurrently lifting said forward locking pin into said rail locking teeth to anchor said inboard seat back bracket support and inboard seat back bracket against said extraordinary rearward forces.

2. In a vehicle having a seat with a weight supporting seat cushion frame and a seat back having a pair of outboard brackets supported on said seat cushion frame in such a way as to remain stationary when subjected to ordinary rearward forces to allow limited rearward rotation of said seat back relative to said seat cushion frame about a pivot axis in the event of extraordinary rearward forces caused by extraordinary vehicle acceleration, said seat back also having at least one inboard bracket intermediate said outboard brackets and rotatable therewith about said same pivot axis, with said seat cushion supported on a vehicle floor by a pair of primary, parallel seat adjuster tracks, and also having a seat belt with a lower attachment point, said seat belt attachment point being subject to normal, forwardly directed tension forces in ordinary operation and potentially subject to higher than normal tension forces in the event of extraordinary vehicle deceleration, an auxiliary seat support with combined seat belt and seat back dynamic anchoring, comprising:

at least one auxiliary support rail fixed to said vehicle floor beneath said seat cushion frame and intermediate said primary tracks, said auxiliary rail having a substantially horizontal upper rail edge and a series of locking teeth below said upper rail edge, a seat belt support slidably supported on said auxiliary support rail and having a pair of forward and rearward, side by side pivot pins, said pivot pins each having a roller freely journaled thereon so that said seat belt support can freely roll back and forth on said upper rail edge, said seat belt support further providing said lower seat belt attachment point above said rollers so that belt tension forces can pull forwardly on said seat belt support to create a forward moment acting about said forward roller and pivot pin, an inboard seat back bracket support pivotally supported to said seat belt support at said forward pivot pin, so that said seat belt support can pivot forward independently of and relative to said inboard seat back bracket support about said forward pivot pin, said inboard seat back bracket support further being fixed to said inboard seat back bracket so that a portion of the weight of said seat acts downwardly through said inboard bracket and bracket support on said forward pivot pin to maintain said forward roller on said rail upper edge in opposition to ordinary rearward forces acting on said seat back and so that extraordinary rearward forces on said seat back create a rearward moment on said inboard seat back bracket support sufficient to lift said forward roller from said rail edge, a tension spring connected between said seat belt support and inboard seat back bracket support, said spring being sufficiently strong to create a rearward moment on said seat belt support acting about said forward pivot pin and roller and to maintain said rearward roller on said upper rail edge in opposition to normal tension forces acting on said seat belt support, but insufficiently strong to oppose extraordinary belt tension forces pulling on said seat belt attachment point, which are sufficient to create a forward moment about said forward roller and pivot pin sufficient to lift said rearward roller from said upper rail edge, a rearward locking pin fixed to said seat belt support and spaced below said locking teeth when said rollers are both engaged with said upper rail edge, and a forward locking pin fixed to said inboard seat back bracket support and spaced below said locking teeth when said rollers are both engaged with said upper rail edge, whereby, when said seat belt and seat back are both subject to ordinary forces, said seat belt support and inboard seat back bracket support can move together along said upper rail edge, on said rollers, as said seat moves fore and aft on said primary seat tracks and said locking pins remain below said locking teeth and said seat belt attachment point maintains a constant position relative to said seat cushion frame, with the weight of said seat at least partially supported by said rollers rolling on said rail upper edge, and when said seat belt is subject to extraordinary tension forces, said seat belt support rotates forward on said forward pivot pin and roller independently of said inboard seat back bracket support, lifting said rearward roller and pivot pin from said upper rail edge while concurrently stretching said tension spring and lifting said rearward locking pin into said rail locking teeth to anchor said seat belt support and seat belt against said extraordinary tension forces, and when said seat back is subject to extraordinary rearward forces, said inboard seat back bracket support and said seat belt support rotate together with said seat back and said outboard seat back brackets while lifting said forward roller and pivot pin from said rail upper edge and concurrently lifting said forward locking pin into said rail locking teeth to anchor said inboard seat back bracket support and inboard seat back bracket against said extraordinary rearward forces.

3. In a vehicle having a seat with a weight supporting seat cushion frame and a seat back having a pair of outboard brackets supported on said seat cushion frame in such a way as to remain stationary when subjected to ordinary rearward forces to allow limited rearward rotation of said seat back relative to said seat cushion frame about a pivot axis in the event of extraordinary rearward forces caused by extraordinary vehicle acceleration, said seat back also having at least one inboard bracket intermediate said outboard brackets and rotatable therewith about said same pivot axis, with said seat cushion supported on a vehicle floor by a pair of primary, parallel seat adjuster tracks, and also having a seat belt with a lower attachment point, said seat belt attachment point being subject to normal, forwardly directed tension forces in ordinary operation and potentially subject to higher than normal tension forces in the event of extraordinary vehicle deceleration, an auxiliary seat support with combined seat belt and seat back dynamic anchoring, comprising;

- at least one auxiliary support rail fixed to said vehicle floor beneath said seat cushion frame and intermediate said primary tracks, said auxiliary rail having a substantially horizontal upper rail edge and a generally horizontal slot beneath said edge with series of locking teeth located below said upper rail edge,
- a seat belt support comprising a pair of plates located on either side of said support rail, said plates and held together by a pair of forward and rearward, side by side pivot pins, said pivot pins each having a roller freely journaled thereon so that said seat belt support can freely roll back and forth on said upper rail edge, said seat belt support further providing said lower seat belt attachment point above said rollers so that belt tension forces can pull forwardly on said seat belt support to create a forward moment acting about said forward roller and pivot pin,
- an inboard seat back bracket support pivotally supported to said seat belt support at said forward pivot pin, so that said seat belt support can pivot forward independently of and relative to said inboard seat back bracket upport about said forward pivot pin, said inboard seat back bracket support further being fixed to said inboard seat back bracket so that a portion of the weight of said seat acts downwardly through said inboard bracket and bracket support on said forward pivot pin to maintain said forward roller on said rail upper edge in opposition to ordinary rearward forces acting on said seat back and so that extraordinary rearward forces on said seat back create a rearward moment on said inboard seat back bracket support sufficient to lift said forward roller from said rail edge,
- a resilient means connected between said seat belt support and inboard seat back bracket support sufficiently strong to create a rearward moment on said seat belt support acting about said forward pivot pin and roller and to maintain said rearward roller on said upper rail edge in opposition to normal tension forces acting on said seat belt support, but insufficiently strong to oppose extraordinary belt tension forces pulling on said seat belt attachment point, which are sufficient to create a forward moment about said forward roller and pivot pin sufficient to lift said rearward roller from said upper rail edge,
- a rearward locking pin joined to each of said seat belt support plates and located in said slot, so as to capture said seat belt support to said rail in cooperation with said forward and rearward pivot pins, said rearward locking pin also being spaced below said locking teeth when said rollers are both engaged with said upper rail edge, and
- a forward locking pin fixed to said inboard seat back bracket support and spaced below said locking teeth when said rollers are both engaged with said upper rail edge, whereby, when said seat belt and seat back are both subject to ordinary forces, said seat belt support and inboard seat back bracket support can move together along said upper rail edge, on said rollers, as said seat moves fore and aft on said primary seat tracks and said locking pins remain below said locking teeth and said seat belt attachment point maintains a constant position relative to said seat cushion frame, with the weight of said seat at least partially supported by said rollers rolling on said rail upper edge, and when said seat belt is subject to extraordinary tension forces, said seat belt support rotates forward on said forward pivot pin and roller independently of said inboard seat back bracket support, lifting said rearward roller and pivot pin from said upper rail edge is opposition to said resilient means while concurrently lifting said rearward locking pin into said rail locking teeth to anchor said seat belt support and seat belt against said extraordinary tension forces, and when said seat back is subject to extraordinary rearward forces, said inboard seat back bracket support and said seat belt support rotate together with said seat back and said outboard seat back brackets while lifting said forward roller and pivot pin from said rail upper edge and concurrently lifting said forward locking pin into said rail locking teeth to anchor said inboard seat back bracket support and inboard seat back bracket against said extraordinary rearward forces.

* * * * *